Oct. 16, 1956    J. VON RANSON    2,766,502
CLAMP FOR ROTARY MOUNT
Filed March 17, 1953
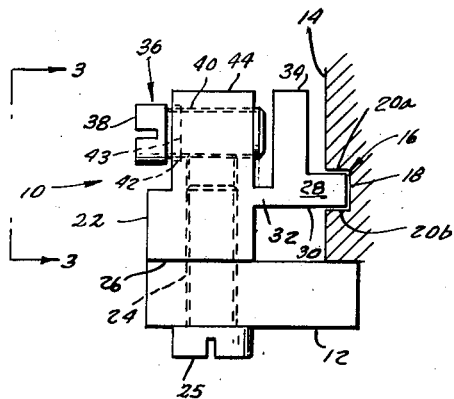
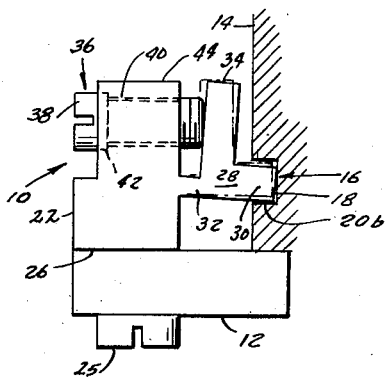
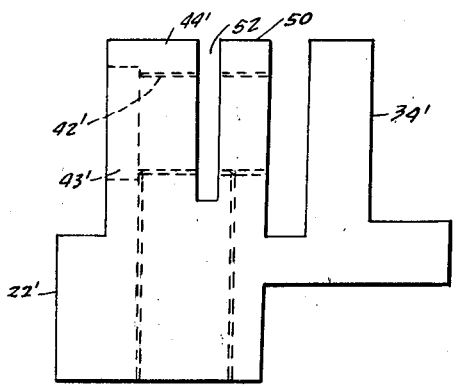
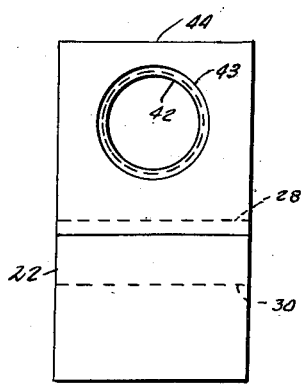
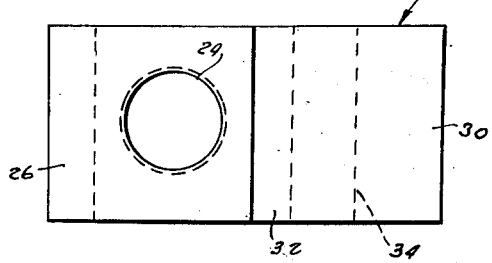
INVENTOR.
JOSEF VON RANSON
BY
ATTORNEYS

United States Patent Office 2,766,502
Patented Oct. 16, 1956

2,766,502

CLAMP FOR ROTARY MOUNT

Josef von Ranson, New Milford, Conn., assignor to Kollsman Instrument Corporation, Elmhurst, N. Y., a corporation of New York Application March 17, 1953, Serial No. 342,934

4 Claims. (Cl. 24—243)

The present invention relates to a device for securing two members together and in particular to a friction type clamp for a rotary mount which is of exceptionally simple yet reliable construction.

In co-pending application Serial No. 342,935, filed concurrently herewith, there is disclosed a tracking mechanism embodying a variable cam of the type including plural radially extending adjustable track defining members mounted on a circular frame. The frame is integral with or fixed to a supporting plate which is adapted to be mounted on a cylindrical base in a particular angular relationship to a drive mechanism including a shaft concentric with the base and operative to drive the tracking mechanism.

In this type of construction, it is necessary to rigidly fix the supporting plate of the circular frame to the base by positive acting and reliable mechanisms which facilitate periodic removal of the track defining assembly and/or reorientation of the assembly by rotating the circular frame from an initial adjusted position into an angularly displaced position. Numerous other applications suggest the need for a clamp incorporating the features of reliability, ease and directness of action, facility to permit angular adjustment of the two members relative to each other, and simplicity in construction.

Accordingly, it is an object of the present invention to provide a novel clamp embodying one or more of the aforesaid features. More particularly, it is an object of the present invention to provide a clamping mechanism for detachably securing two members in a selected angular position relative to each other and facilitating reorientation of the members through rotation of one or both of the members relative to each other.

Certain objects and features of the present invention are realized by providing a clamp incorporating a support adapted to be secured to one of two members which are rotatably displaceable relative to each other. The support is formed with or carries a projecting flexible beam-like clamp finger including a bearing part adapted to be received within a seating part on the other of the members. Clamping action is obtained by applying a transverse bending load to the clamp finger to urge the bearing part into frictional engagement with the seating part on the other member. The transverse bending load is preferably derived from a clamp bolt which is movable along a linear path, spaced from and parallel to the normal direction of the beam-like clamping finger, the clamp bolt operating on an integral loading finger fixed transversely of the clamp finger.

As a further feature, suitable means can be provided to permit locking of the clamp bolt in an adjusted position wherein the clamp finger is in frictional contact with the accommodating seating part on the adjacent member.

The brief description and many other objects, advantages and features of the present invention will be best understood by those skilled in the art by specific reference to the description of a preferred embodiment of the invention which particularly points out in an exact and complete manner where I have made an advance in the arts and sciences. The description will be best understood by reference to the drawing wherein:

Figure 1 is a side elevational view, with parts broken away and shown in section, of the clamp of the present invention shown in an inoperative position between two members to be clamped together in a selected position of angular adjustment relative to each other.

Figure 2 is a side elevational view similar to Figure 1 but showing the clamp in the operative position securing the two members in the adjusted position.

Figure 3 is an end elevational view of the unitary support including the clamp finger and loading arm as viewed from the left of Figure 1.

Figure 4 is a bottom plan view of the unitary support of Figure 3.

Figure 5 is a side elevational view of a modification of the unitary support illustrating an additional feature of the invention by which the clamp bolt may be locked in an adjusted position.

Referring now specifically to the drawings, there is shown the clamp of the present invention, generally designated by the reference numeral 10, which is supported on a plate 12 of a frame for a variable cam of the type described in my above-mentioned co-pending application. The clamp 10 serves to fix the supporting plate 12 and the track defining members carried thereby in a select angular adjusted position relative to the base 14 which is provided with a circumferential groove 16 in the periphery thereof, the groove including a floor 18 and opposed side walls 20a, 20b.

The clamp 10 includes a support 22 which is provided with a threaded bore 24 extending upwardly from the underface 26 thereof and terminating approximately at the transverse center line of the support 22. The bore 24 receives a securing bolt 25 for fixing the support 22 to the plate 12. Projecting outwardly from the support 22 is a flexible beam-like clamp finger 28 extending generally toward the circumferential groove 16 which provides a seating part for the free extremity 30 of the beam-like clamp finger 28. The extremity 30 is of appropriate cross-section to be received within the slot 16 intermediate the upper and lower side walls 20a, 20b thereof. The beam-like clamping finger 28 is joined to the support proper by a connecting neck 32 of reduced cross-section as compared to the cross-section of the bearing part 30, the neck 32 facilitating deflection of the finger from the normal position, illustrated by the full lines in Figure 1 and the broken lines in Figure 2.

For the purposes of applying a transverse bending load to the clamp finger, there is provided an integral loading arm 34 which is arranged normal to the finger 28 intermediate the larger cross-section bearing part 30 and the reduced connecting neck 32. The loading arm 34 is arranged substantially parallel to the longitudinal center line of the support 22 which can be considered to coincide with the axis of the threaded bore 24.

Loading forces are applied to the arm 34 by a clamp bolt 36 including a suitably slotted head 38 and an externally threaded body 40. The clamp bolt 36 is received within a complementary threaded hole 42 in an upwardly extending part 44 of the support 22, the slotted head being accommodated in a complementary countersink 43. The clamp bolt hole 42 has its axis arranged normal to the axis of the securing bolt hole 24. As best seen in Figure 2, the end of the clamp bolt 36 remote from the slotted head 38 serves as an abutment which is adapted to bear against the loading arm 34 for deflecting same into the loaded position of Figure 2 wherein the bearing part 30 frictionally engages and bears against the accommodating slot or groove 16, specifically the lower wall or ledge 20b thereof.

The cross-sectional area of the reduced connecting neck 32 as well as the flexibility of the material for the unitary support and clamp finger is selected to obtain the desired holding force, yet permit the ready deflection under control of the clamp bolt 36 and return to the normal position illustrated in Figure 1.

The described clamp is employed in substantially the following manner in connection with a tracking mechanism embodying a variable cam which is to be angularly related to the shaft of a main drive. The supporting plate 12 of the variable cam is fixed to the support 22 of the clamp 10 by threadedly engaging the bolt 25 in the complementary threaded hole 24 of the clamp. The bearing part 30 is initially positioned, as seen in Figure 1, in nested relation with the slot 16 and out of frictional contact with the walls 18, 20a, 20b thereof.

Any suitable arrangement may be employed to permit initial adjustment of the clamp support 22 relative to the base 10 to obtain the desired orientation of the clamp finger 30 relative to the accommodating slot or groove 16. Thereupon and subsequent to achieving the desired angular adjustment of the cam track plate 12 relative to the base 14, the clamp bolt 36 is rotated to bring the abutment end thereof against the loading arm 34. Continued rotation of the bolt causes deflection of the clamp finger which is in effect a cantilever supported beam due to the rigid connection at the fulcrummed end defined by the reduced neck 32. As the clamp finger 28 is deflected, the bearing part 30 comes into frictional contact with the walls of the slot 16, continued rotation resulting in the requisite binding and holding force between the clamp finger 30 and the base 14.

When the variable cam supporting plate 12 is to be reoriented, it is merely necessary to turn back the clamp bolt which frees the loading arm 34 for restoration to the initial position illustrated in Figure 1. In this connection, it is to be again observed that the entire unitary clamp head which includes the support 22, the cantilevered clamp finger 28 and the loading arm is of a material of sufficient resilience to assure return of the loading arm and the clamp finger to the initial position upon the removal of the deflecting load.

In Figure 5 there is shown a modified form of integral support and clamp finger in which the upwardly projecting part 44' of the support 22', arranged to accommodate the bolt and formed with the threaded and the countersunk bore 42', is transversely undercut to form a lock finger 50 intermediate the support proper and the loading arm 34'. The slot 52 intermediate the lock finger 50 and the support part 44' permits displacement of the finger 50 toward the support when the slotted bolt head is received within the countersink 43'.

At this time continued rotation of the bolt cannot cause further deflection of the loading arm 34' but causes the lock finger 50 to be fed toward the support part 44' to create a "lock nut" effect. This assures the maintenance of the clamp bolt 38 in the adjusted position due to the binding between the clamp bolt 38 and the lock finger 50.

In the foregoing I have described my invention solely in connection with specific illustrative embodiments thereof. Since many variations and modifications of the invention will now be obvious to those skilled in the art, I prefer to be bound not by the specific disclosures herein contained but only by the appended claims.

I claim:

1. A clamp for joining two members together comprising a support adapted to be secured to one of said members, a flexible beam-like clamp finger integral with and projecting from said support, said beam-like clamping finger terminating in a bearing part adapted to be received within a seating part on the other of said members, a loading arm integral with and projecting from said clamping finger intermediate said bearing part and said support, and means on said support engaging said loading arm to deflect said loading arm and causing said bearing part of said clamping finger to frictionally engage said seating part of said other member.

2. A clamp for joining two members together in an adjusted position comprising a support, securing means for fixing one of said members to said support, a beam-like clamping finger integral with and projecting from said support, said clamping finger terminating in a bearing part receivable within a seating part in the other of said members, a loading arm integral with and normal to said clamping finger, and a clamp bolt movably mounted on said support for adjustment along a path parallel to and spaced from said clamping finger, said clamp bolt being movable into abutment with said loading arm to deflect said loading arm and said clamp finger into a locking position wherein said bearing part is deflected into frictional contact with said seating part.

3. A clamp for joining two members together in an adjusted position comprising a support, securing means for fixing one of said members to said support, a beam-like clamping finger integral with and projecting from said support, said clamping finger terminating in a bearing part receivable within a seating part in the other of said members, a loading arm integral with and normal to said clamping finger, and a clamp bolt movably mounted on said support for adjustment along a path parallel to and spaced from said clamping finger, said clamp bolt being movable into abutment with said loading arm to deflect said loading arm and said clamp finger into a locking position wherein said bearing part is deflected into frictional contact with said seating part, said clamping finger intermediate said loading arm and said support being smaller in cross-section as compared to the cross-section of the remainder of said clamp finger to provide a reduced connecting neck.

4. A clamp for joining two members together in an adjusted position comprising a support adapted to be fixed to one of said members, a beam-like clamping finger integral with and projecting from said support, said clamping finger terminating in a bearing part receivable within a seating part in the other of said members, a loading arm integral with and normal to said clamping finger, a clamp bolt movably mounted within a threaded bore in said support for adjustment along a path parallel to and spaced from said clamping finger, said clamp bolt being movable into abutment with said loading arm to deflect said loading arm and said clamp finger into a locking position wherein said bearing part is deflected into frictional contact with said seating part, the part of said support provided with said threaded bore being undercut transversely to said threaded bore to form a lock finger separated from the support proper and displaceable toward the latter for locking said clamp bolt in an adjusted position.

References Cited in the file of this patent

UNITED STATES PATENTS

| | | |
|---|---|---|
| 441,848 | Kemp | Dec. 2, 1890 |
| 591,421 | Palmer | Oct. 12, 1897 |
| 2,118,878 | Bowman | May 31, 1938 |
| 2,220,214 | Cloutier | Nov. 5, 1940 |
| 2,452,796 | Skibsted | Nov. 2, 1948 |